United States Patent [19]

Hoffmann et al.

[11] Patent Number: 5,972,158
[45] Date of Patent: *Oct. 26, 1999

[54] BONDING PLASTICS WITH WATER-BASED POLYURETHANE PRIMER

[75] Inventors: Horst Hoffmann, Graupa; Hans-Georg Kinzelmann, Pulheim; Hans-Peter Kohlstadt, Velbert, all of Germany

[73] Assignee: Kenkel Kommanditgeselschaft auf Aktien, Duesseldorf, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/716,261

[22] PCT Filed: Mar. 6, 1995

[86] PCT No.: PCT/EP95/00816

§ 371 Date: Oct. 15, 1996

§ 102(e) Date: Oct. 15, 1996

[87] PCT Pub. No.: WO95/25138

PCT Pub. Date: Sep. 21, 1995

[30] Foreign Application Priority Data

Mar. 14, 1994 [DE] Germany ............ 44 08 487

[51] Int. Cl.$^6$ ............ C09J 5/02; C09J 175/06; C09J 175/00; C09J 5/06; C08G 18/42; C08G 18/74

[52] U.S. Cl. .................. 156/331.4; 156/307.5; 156/331.1; 156/331.7; 427/375; 427/393.5; 427/299; 427/314; 427/316; 428/423.1; 428/423.3; 428/424.2; 428/424.4; 428/424.6; 428/424.8; 524/507; 524/591; 524/840; 525/123; 525/127; 525/128; 525/131; 525/455; 525/457; 528/71

[58] Field of Search ............ 156/307.5, 331.1, 156/331.4, 331.7; 427/375, 299, 393.5, 314, 316; 524/507, 591, 840; 525/123, 127, 128, 131, 455, 457; 528/71; 428/423.1, 423.3, 424.2, 424.6, 424.4, 424.8

[56] References Cited

U.S. PATENT DOCUMENTS

| | | | |
|---|---|---|---|
| 4,523,003 | 6/1985 | Bezwada | 528/58 |
| 5,039,733 | 8/1991 | Dormish et al. | 524/591 |
| 5,045,393 | 9/1991 | Kumanoya et al. | 428/353 |
| 5,468,540 | 11/1995 | Lu | 428/156 |

FOREIGN PATENT DOCUMENTS

| | | |
|---|---|---|
| 928323 | 6/1973 | Canada . |
| 0 307 546 | 3/1989 | European Pat. Off. . |
| 0307546 | 3/1989 | European Pat. Off. . |
| 354 471 | 2/1990 | European Pat. Off. . |
| 0 369 389 | 5/1990 | European Pat. Off. . |
| 15 95 602 | 9/1969 | Germany . |
| 20 35 732 | 1/1972 | Germany . |
| 36 43 791 | 6/1988 | Germany . |
| 37 35 587 | 5/1989 | Germany . |
| 41 09 477 | 9/1992 | Germany . |
| 2 104 085 | 3/1983 | United Kingdom . |
| 92/16576 | 10/1992 | WIPO . |

OTHER PUBLICATIONS

Kleben: Grundlagen, Technologie, Anwendungen (Bonding: Basic Principles, Technology, Applications) (1990) p. 447.
Marktspiegel Kunstoffkleben Verlag TUV Rheinland (1991), pp. 323–324.
D. Dieterich, Angew Makromol. Chem, 98 (1981) p. 133.
Ullmann, Encyklopaedie der Technischen Chemie, 4th Edition, vol. 19, 1980.
Houben–Weyl, Methoden der Organischen Chemie, vol. E 20/Part 1–3, pp. 1659–1663 and 1671–1681, 1987.
Journal of Waterborne Coating, Aug. 1984, p. 2 et seq.
D.Dieterich, Chemie in Unserer Zeit 24 (1990) 135 to 141.
G. Woods, *The ICI Polyurethanes Book*, Wiley, pp. 38–39.
G. Dertel, *Polyurethane Handbook*, Hanser, pp. 18–19.

*Primary Examiner*—Rabon Sergent
*Attorney, Agent, or Firm*—Ernest G. Szoke; Wayne C. Jaeschke; Stephen D. Harper

[57] ABSTRACT

A process of bonding a plastic is provided. The process comprises applying to a plastic surface an aqueous dispersion of a hydroxyl-functional polyurethane prepolymer obtained by:

(1) reaction of:
  a polyol component containing a polyester polyol,
  a compound selected from the group of compounds containing groups capable of salt formation and at least two isocyanate-reactive groups,
  an isocyanate component in a stoichiometric excess, at least 20% by weight of said component consisting of tetramethyl xylylene diisocyanate, and (2) subsequent dispersion in water and at least partial reaction of the remaining NCO groups with an aminoalcohol and, optionally, subsequent chain extension. The process further comprises drying said applied aqueous dispersion to form a primer and bonding said plastic surface having said primer to a part to be joined thereto. The process is particularly useful for priming plastics such as polyvinyl chloride.

37 Claims, No Drawings

BONDING PLASTICS WITH WATER-BASED POLYURETHANE PRIMER

BACKGROUND OF THE INVENTION

1. Field of the Invention

This invention relates to a water-based polyurethane primer for bonding plastics, more especially PVC.

2. Discussion of Related Art

It is known from EP 307 546 that solventless aqueous polyurethane dispersions can be used as a primer coating for plastic films based on rigid or semirigid PVC for the lamination of porous materials In addition, dispersion primers based on ethylene/vinyl acetate copolymers, ethylene/vinyl acetate rubber or acrylates are also described. A dispersion adhesive is mentioned as the adhesive. Chipboards and rigid PVC films are bonded to one another with this primer/adhesive combination.

In addition, it is generally known that PVC adherends can readily be bonded to one another with a diffusion adhesive based on tetrahydrofuran and 10 to 20% of PVC or on a two-pack adhesive such as, for example, epoxy, polyurethane, polymethyl methacrylate or unsaturated polyester (see G. Habenicht "Kleben: Grundlagen, Technologie, Anwendungen (Bonding: Basic Principles, Technology, Applications)" (1990), page 447). Unfortunately, these adhesives are attended by the disadvantage that they emit solvent and thus endanger the environment or require a longer time for setting than the machine cycle times allow. It is also generally known that, for example, PVC adherends or other adherends can be bonded to one another with a polyurethane hotmelt adhesive (see Michaeli/Netze/Freitag "Marktspiegel Kunststoffkleben" Verlag TÜV Rheinland (1991), pages 323 and 324). It is also known that PVC profiles and PVC films can be bonded with a polyurethane hotmelt adhesive. The profile is prepared by treatment with chlorinated hydrocarbons, for example with methylene chloride. Accordingly, this bonding process also involves emissions and endangers the environment, all the more so insofar as PVC profiles are very widely used as solid, hollow or core profiles by virtue of their ease of production by extrusion, their low costs and their good performance properties. The PVC to be used for this purpose may be both flexible PVC and semirigid or rigid PVC. To improve the profiles and, above all, to enhance their appearance, they are surface-treated. This is generally done by lamination with a film. The films preferably consist of PVC and are generally between 0.1 and 1.0 mm thick. As with many bonded joints in the industrial sector, the lamination of PVC profiles is also determined by the production process, In other words, high initial strength in a short time and even greater ultimate strength are generally necessary.

Against the background of this prior art, the problem addressed by the present invention was to provide an adhesive system which would be solvent-free and which would bond plastics, more especially PVC profiles, to PVC films and other plastic and paper films in a reasonably quick time so that processing would not be slowed down in any way. The performance properties would of course not suffer either.

SUMMARY OF THE INVENTION

The solution provided by the invention is defined in the claim and essentially lies in the choice of a special PU primer and in the choice of a reactive polyurethane hotmelt adhesive.

DETAILED DESCRIPTION OF THE INVENTION

Accordingly, the present invention relates to a water-based polyurethane primer for bonding plastics, characterized in that at least 20% by weight of the polymer content emanates from an aqueous dispersion of OH-functional polyurethane prepolymers obtainable by reaction of a polyol component containing polyester polyols (I) and compounds containing groups capable of salt formation and at least two isocyanate-reactive groups (II) with an isocyanate component consisting of at least 20% by weight of tetramethyl xylylene diisocyanate (TMXDI) (III) in a stoichiometric excess, subsequent dispersion in water and at least partial reaction of the remaining NCO groups with amino alcohols (IV) and, optionally, subsequent chain extension.

The primer may contain up to 80%, based on the solids content, of polymers which do not correspond to the OH-functional polyurethane prepolymers described in the following. Polymers based on acrylic compounds, i.e. acrylates and methacrylates, are particularly suitable. Besides homopolymers, copolymers and terpolymers are also suitable. Polymers of other acrylic compounds, for example acrylonitrile, are also suitable. Other suitable polymers are, in particular, vinyl acetate, SBR latices and vinyl alcohol. Although favorable results can be obtained with a polymer content of 20% by weight of polyurethane prepolymers in the dispersion, the content of these prepolymers preferably exceeds 50 or even 70% by weight. In one particular embodiment, the polyurethane prepolymers are the only polymers present in the dispersion. The aqueous dispersion may be comprised of up to about 50 parts by weight of an acrylate copolymer per 100 parts by weight of the hydroxyl-functional polyurethane prepolymer dispersion.

The polyester polyols present in the polyol component (I) are preferably based at least predominantly on adipic acid and/or phthalic acid as the starting substance. Mixed esters of the two acids mentioned are also suitable. Pure polyadipates or polyphthalates and mixtures thereof are particularly suitable. Particularly favorable results are obtained when, in addition, the polyester polyols mentioned are based on glycol homologs containing ether oxygen as the alcohol component.

The polyester polyols mentioned are present in (I) in a quantity of preferably at least 50% by weight and, more preferably, at least 75% by weight. In one particularly advantageous embodiment, they are used without significant further additions. Suitable polyester polyols are also described in DE 37 35 587. Of these, the homologs formally obtainable by addition of alkylene oxides are particularly suitable. Adducts of ethylene oxide are mentioned in particular, although adducts of propylene oxide and/or butylene oxide may also be used. Diethylene glycol is particularly suitable.

Accordingly, up to 50% by weight, but preferably less, of the polyester polyols on which the polyurethane dispersions used in accordance with the invention are based may be replaced by other polyols typically encountered in such formulations. As a general rule, these other polyols—in exactly the same way as the polyester polyols—must also contain at least two isocyanate-reactive hydrogen atoms and should be substantially linear. Suitable other polyols are, for example, polyethers, polyacetals, polycarbonates, polythioethers, polyamides, polyester amides and/or other polyesters containing an average of two to at most four reactive hydrogen atoms. In special cases, it may be preferable to add one part of polyols of higher functionality, more especially trifunctional products, to the predominantly difunctional polyols. The degree of precrosslinking may be varied according to the quantity used.

Polycarbonates in this context are understood to be polyesters which, theoretically, may be prepared by esterification of carbonic acid with dihydric or polyhydric alcohols and which contain one hydroxyl group at either end of the chain. The alcohols and, ultimately, the polycarbonate diols preferably have an aliphatic structure. Suitable polyhydric alcohols may be, for example, trihydric, such as glycerol for example. However, dihydric alcohols are preferred, particularly where they contain not less than 4 and not more than 10 carbon atoms. Although cyclic and branched alcohols are suitable, linear alcohols are preferred. The hydroxyl groups may be arranged adjacent, for example in the 1,2-position, or may even be isolated. OH-terminated diols are preferred.

Suitable polyethers are, for example, the polymerization products of ethylene oxide, propylene oxide, butylene oxide and copolymerization or graft polymerization products thereof and the polyethers obtained by condensation of polyhydric alcohols or mixtures thereof and the polyethers obtained by alkoxylation of polyhydric alcohols, amines, polyamines and aminoalcohols. Other suitable polyethers are the polytetrahydrofurans described in EP 354 471 and ethylene-glycol-terminated polypropylene glycols.

Suitable polyacetals are, for example, the compounds obtainable from glycols, such as diethylene glycol, triethylene glycol, hexanediol and formaldehyde. Suitable polyacetals may also be obtained by polymerization of cyclic acetals.

Among the polythioethers, the condensation products of thiodiglycol with itself and/or with other glycols, dicarboxylic acids, formaldehyde, aminocarboxylic acids or aminoalcohols are mentioned in particular. Depending on the co-components, the products in question are polythioethers, polythio mixed ethers, polythioether esters, polythioether ester amides. Corresponding polyhydroxyl compounds may also be used in alkylated form or in admixture with alkylating agents.

The polyesters, polyester amides and polyamides include the predominantly linear condensates, for example polyterephthalates, obtained from polybasic saturated and unsaturated carboxylic acids or their anhydrides and polyhydric, saturated and unsaturated alcohols, aminoalcohols, diamines, polyamines and mixtures thereof. Polyesters of lactones, for example caprolactone, or of hydroxycarboxylic acids may also be used. The polyesters may contain terminal hydroxyl or carboxyl groups. Relatively high molecular weight polymers or condensates, for example polyethers, polyacetals, polyoxymethylenes, may also be used as alcohol component for their production.

Polyhydroxyl compounds already containing urethane or urea groups and optionally modified natural polyols, such as castor oil, may also be used. Basically, polyhydroxyl compounds containing basic nitrogen atoms, for example polyalkoxylated primary amines or polyesters or polythioethers containing alkyl diethanolamine in co-condensed form, may also be used. Polyols obtainable by complete or partial ring opening of epoxidized triglycerides with primary or secondary hydroxyl compounds, for example the reaction product of epoxidized soybean oil with methanol, may also be used. Copolymers of the polyhydroxy compounds mentioned and analogs thereof preferably containing terminal amino or sulfide groups are also suitable.

The polyols mentioned above, more especially the polyester polyols, preferably have an average molecular weight of 300 to 5,000. A molecular weight in the range from 500 to 3,000 is particularly suitable. These molecular weight ranges are number average molecular weight ranges calculated from the OH value.

Component (II), also known as an internal emulsifier, reacted with the polyol component (I) and the isocyanate component (III) is a compound which contains at least two isocyanate-reactive groups and, in addition, at least one other group capable salt formation. The group capable of salt formation is preferably a carboxylic acid, a sulfonic acid or an ammonium compound. Dihydroxy or even diamino compounds containing an ionizable carboxylic acid, sulfonic acid or ammonium group may also be used for this purpose. These compounds may either be used as such or may be prepared in situ. Carboxylic acid derivatives, sulfonic acid diamines and/or amino diols are preferred. In order to introduce compounds containing ionizable carboxylic acid groups into the polyurethane, the expert may add to the polyols special dihydroxycarboxylic acids which are substantially or completely unable to enter into secondary reactions involving the carboxyl groups and the isocyanate groups. These special dihydroxycarboxylic acids are, in particular, carboxylic acid diols with 4 to 10 carbon atoms. A preferred dihydroxycarboxylic acid or carboxylic acid diol is dimethylol propionic acid (DMPA).

In order to introduce sulfonic acid groups capable of salt formation, a diaminosulfonic acid may be added to the polyols. Examples are 2,4-diaminobenzene sulfonic acid or even the N-(ω-aminoalkane)-ω'-aminoalkane sulfonic acids described in DE 20 35 732.

In order to introduce ammonium groups capable of salt formation into the polymer, the polyurethane prepolymer may even be modified with an aliphatic and aromatic diamine—in accordance with DE 15 95 602—in such a way that primary amino groups are present at the chain ends and may subsequently be converted into quaternary ammonium compounds or into amine salts with standard alkylating agents.

The polymers are preferably present in salt form in the polyurethane prepolymer dispersions used in accordance with the invention. In the preferred polymers modified with carboxylic acids or sulfonic acids, alkali metal salts, ammonia or amines, i.e. primary, secondary or tertiary amines, are preferably present as counterions. In the cationically modified products, acid anions, for example chloride, sulfate or the anions of organic carboxylic acids, are present as counterions. Accordingly, the groups capable of salt formation may be completely or partly neutralized by the counterions. An excess of neutralizing agent is also possible.

Amino diols, preferably diethanolamine, may also be used as compounds containing an ionizable ammonium group for component (II). The compounds mentioned as suitable for component (II) may of course also be used in admixture with one another. Corresponding compounds are also described in GB 2,104,085 and in DE 36 43 791.

It has been found that, apart from such factors as freedom to foam, thorough film wetting and favorable drying properties, it can be of advantage in one preferred embodiment of the invention for the polyurethane dispersions used to be made up of such fine particles that they represent an opaque system. Dispersibility can be increased by increasing the percentage content of emulsifiers, such as carboxylic acid diols, more especially DMPA.

In one particular embodiment, the content of (II) in the polyurethane prepolymer may be from 1 to 13% by weight, preferably from 2 to 8% by weight and, more preferably, from 3 to 6% by weight, based on the solids content. A relatively small quantity of dihydroxycarboxylic acids, more especially DMPA, has the advantage that, when they are neutralized, for example with sodium hydroxide, correspondingly small quantities of basic salts are formed which can have a positive effect on the stability of such systems in storage. In addition, relatively high resistance of the cured adhesive to water can be achieved inter alia through the comparatively small content of (II). Favorable to very good properties of the system can be achieved in particular when, in addition to the relatively small quantities of (II) mentioned, (I) contains polyester polyols essentially based on glycols containing ether oxygen as the alcohol component. Polyester polyols based at least predominantly on diethylene glycol as diol component are particularly suitable.

The polyfunctional isocyanate component on which the polyurethane dispersions are based consists completely or partly of $\alpha,\alpha,\alpha',\alpha'$-tetramethyl xylylene diisocyanate (TMXDI). The meta-isomeric form is particularly suitable. A polyurethane dispersion suitable for use in accordance with the invention can only be obtained with a minimum content of around 20% by weight of TMXDI in the isocyanate mixture. At least 30% by weight and, better yet, at least 50% by weight of the isocyanate mixture preferably consists of TMXDI. As a general rule, the viscosity-related handling behavior of the products or intermediate products in the production of the polyurethane prepolymers is better, the higher the percentage content of TMXDI in the isocyanate mixture. Accordingly, isocyanate components (III) of which half or more, for example up to two thirds or three quarters and preferably all, contains TMXDI are preferred. Occasionally, TMXDI is also written down as tetramethyl xylene diisocyanate.

Suitable additional polyisocyanates, i.e. as the balance to 100% by weight, are any polyfunctional, aromatic and aliphatic isocyanates, for example 1,5-naphthylene diisocyanate, 4,4'-diphenyl methane diisocyanate (MDI), hydrogenated MDI ($H_{12}$MDI), trimethyl hexane diisocyanate (TMDI), xylylene diisocyanate (XDI), 4,4'-diphenyl dimethyl methane diisocyanate, di- and tetraalkyl diphenyl methane diisocyanate, 4,4'-dibenzyl diisocyanate, 1,3-phenylene diisocyanate, 1,4-phenylene diisocyanate, the isomers of tolylene diisocyanate (TDI), optionally in admixture with 1-methyl-2,4-diisocyanatocyclohexane, 1,6-diisocyanato-2,2,4-trimethyl hexane, 1,6-diisocyanato-2,4,4-trimethyl hexane, 1-isocyanatomethyl-3-isocyanato-1,5,5-trimethyl cyclohexane, chlorinated and brominated diisocyanates, phosphorus-containing diisocyanates, 4,4'-diisocyanatophenyl perfluoroethane, tetramethoxybutane-1,4-diisocyanate, butane-1,4-diisocyanate, hexane-1,6-diisocyanate (HDI), dicyclohexyl methane diisocyanate, cyclohexane-1,4-diisocyanate, ethylene diisocyanate, phthalic acid-bis-isocyanatoethyl ester; also polyisocyanates containing reactive halogen atoms, such as 1-chloromethylphenyl-2,4-diisocyanate, 1-bromomethylphenyl-2,6-diisocyanate, 3,3-bis-chloromethyl ether-4,4'-diphenyl diisocyanate. Sulfur-containing polyisocyanates are obtained, for example, by reaction of 2 moles of hexamethylene diisocyanate with 1 mole of thioglycol or dihydroxydihexyl sulfide. Other important diisocyanates are trimethyl hexamethylene diisocyanate, 1,4-diisocyanatobutane, 1,2-diisocyanatododecane and dimer fatty acid diisocyanate. Also of interest are partly masked polyisocyanates from which self-crosslinking polyurethanes can be formed, for example dimeric tolylene diisocyanate, or polyisocyanates partly reacted, for example, with phenols, tert.butanol, phthalimide, caprolactam.

In one particular embodiment, the isocyanate component contains dimer fatty acid isocyanate. Dimer fatty acid is a mixture of predominantly $C_{36}$ dicarboxylic acids which is obtained by thermal or catalytic dimerization of unsaturated $C_{18}$ monocarboxylic acids, such as oleic acid, tall oil fatty acid or linoleic acid. Dimer fatty acids have long been known to the expert and are commercially available. The dimer fatty acid can be reacted to form dimer fatty acid isocyanates. Technical dimer fatty acid diisocyanate contains on average at least two and less than three isocyanate groups per molecule of dimer fatty acid.

The above-mentioned isocyanates may be used both individually and in combination with one another for addition to TMXDI. Aliphatic diisocyanates, more especially cyclic or branched aliphatic diisocyanates, above all isophorone diisocyanate (IPDI), are preferred. In admixture with TMXDI, HDI, IPDI, XDI, TMDI, TDI, MDL and/or $H_{12}$MDI are particularly suitable. Other suitable polyisocyanates are known from the patent literature, for example from DE 37 35 587.

With the above-mentioned contents of TMXDI, the polyurethane prepolymers may be produced with a smaller quantity of solvents as compared with conventional processes, for example the acetone process.

In one particular embodiment, no solvent at all is used in the production process. It is possible in this way to ensure that the polymer dispersion according to the invention has a low solvent content and is preferably solvent-free.

Suitable polyfunctional isocyanates preferably contain on average two to at most four NCO groups. The quantities of polyol mixture (I) and the mixture of polyfunctional isocyanates (III) are selected so that a certain ratio of NCO-reactive groups to NCO groups (NCO:OH addition ratio) is present. The isocyanate component is preferably present in more than the stoichiometrically necessary quantity, but on the other hand does not exceed twice the content of NCO reactive groups. A ratio of 1.7 or lower is particularly favorable. At all events, the preferred optimal range so far as subsequent performance results are concerned is above 1.

According to the invention, the prepolymer formed by the reaction of components (I), (II) and (III) is reacted with amino alcohols (IV) so that the NCO groups remaining in the prepolymer are at least partly reacted with (IV). Amino alcohols containing a primary or secondary amino group are particularly suitable for this reaction of the NCO-terminated prepolymers, which is also known as "back-addition". Compounds containing a tertiary amino group are also suitable. Low molecular weight amino alcohols are preferred, those containing from 2 to 40 carbon atoms and preferably from 2 to 12 carbon atoms being particularly suitable. Examples of suitable representatives are ethanolamine, diethanolamine, N-butyl ethanolamine, neopentanolamine and diglycol amine and also amino sugars. The isocyanate groups may be partly or completely reacted with the amino-alcohols mentioned. A preferred addition ratio of NCO to NHR groups is 1:1 to 1:0.1 and, more particularly, 1:0.8 to 1:0.2. R stands for hydrogen (preferred) or alkyl or aralkyl. In one particular embodiment, monoaminoalcohols are exclusively used as (IV). As a result of the above-mentioned reaction with (IV), the NCO groups in the prepolymer are at least partly replaced by polymer-bonded hydroxyl groups with formation of urea groups. Subsequent chain extension is thus completely or partly suppressed without any loss of functionality. Accordingly, the action of (IV) on the freshly formed dispersion gives a reaction product which, commensurate with the quantity of (IV) added, based on a material with the same NCO content in the original prepolymer, but which has been chain-extended, remains substantially lower in its molecular weight and shows more clearly pronounced tackiness of the dried residue. This applies in particular when monoaminoalcohols are used as (IV). Polyurethane prepolymers which do not contain any reactive nitrogen-containing groups, more especially no reactive amino or semicarbazide groups, can advantageously be produced in this way. If desired, the reaction with the aminoalcohols may be followed by chain extension.

Chain-extending agents containing reactive hydrogen atoms include:

the usual saturated and unsaturated glycols, such as ethylene glycol or condensates of ethylene glycol, butane-1,3-diol, butane-1,4-diol, butenediol, propane-1,2-diol, propane-1,3-diol, neopentyl glycol, hexanediol, bis-hydroxymethyl cyclohexane, dioxyethoxyhydroquinone, terephthalic acid-bis-glycol ester, succinic acid di-2-hydroxyethylamide, succinic acid di-N-methyl-(2-hydroxyethyl)-amide, 1,4-di-(2-hydroxymethylmercapto)-2,3,5,6-tetrachlorobenzene, 2-methylenepropane-1,3-diol, 2-methylpropane-1,3-diol;

aliphatic, cycloaliphatic and aromatic diamines, such as ethylenediamine, hexamethylenediamine, 1,4-cyclohexylenediamine, piperazine, N-methyl propylenediamine, diaminodiphenyl sulfone, diaminodiphenyl ether, diaminodiphenyl dimethyl methane, 2,4-diamino-6-phenyl triazine, isophoronediamine, dimer fatty acid diamine;

aminoalcohols, such as ethanolamine, propanolamine, butanolamine, N-methyl ethanolamine, N-methyl isopropanolamine;

aliphatic, cycloaliphatic, aromatic and heterocyclic mono- and diaminocarboxylic acids, such as glycine, 1- and 2-alanine, 6-aminocaproic acid, 4-aminobutyric acid, the isomeric mono- and diaminobenzoic acids, the isomeric mono- and diaminonaphthoic acids;

water.

Special chain-extending agents containing at least one basic nitrogen atom are, for example, mono-, bis- or polyalkoxylated aliphatic, cycloaliphatic, aromatic or heterocyclic primary amines, such as N-methyl diethanolamine, N-ethyl diethanolamine, N-propyl diethanolamine, N-isopropyl diethanolamine, N-butyl diethanolamine, N-isobutyl diethanolamine, N-oleyl diethanolamine, N-stearyl diethanolamine, ethoxylated cocoamine, N-allyl diethanolamine, N-methyl diisopropanolamine, N-ethyl diisopropanolamine, N-propyl diisopropanolamine, N-butyl diisopropanolamine, C-cyclohexyl diisopropanolamine, N,N-diethoxyl aniline, N,N-diethoxyl toluidine, N,N-diethoxyl-1-aminopyridine, N,N'-diethoxyl piperazine, dimethyl-bis-ethoxylhydrazine, N,N'-bis-(2-hydroxyethyl)-N,N'-diethyl hexahydro-p-phenylenediamine, N-12-hydroxyethyl piperazine, polyalkoxylated amines, such as propoxylated methyl diethanolamine, also such compounds as N-methyl-N,N-bis-3-aminopropylamine, N-(3-aminopropyl)-N,N'-dimethyl ethylenediamine, N-(3-aminopropyl)-N-methyl ethanolamine, N,N'-bis-(3-aminopropyl)-N,N'-dimethyl ethylenediamine, N,N'-bis-(3-aminopropyl)-piperazine, N-(2-aminoethyl)piperazine, N,N'-bis-oxyethylpropylenediamine, 2,6-diaminopyridine, diethanolaminoacetamide, diethanolamidopropionamide, N,N-bis-oxyethyl phenyl thiosemicarbazide, N,N-bis-oxyethylmethyl semicarbazide, p,p'-bis-aminomethyl dibenzyl methylamine, 2,6-diaminopiperidine, 2-dimethyl aminomethyl-2-methyl propane-1,3-diol.

Chain-extending agents containing halogen atoms or R—SO$_2$O groups capable of quaternization are, for example, glycerol-1-chlorohydrin, glycerol monotosylate, pentaerythritol bis-benzene sulfonate, glycerol monomethane sulfonate, adducts of diethanolamine and chloromethylated aromatic isocyanates or aliphatic haloisocyanates, such as N,N-bis-hydroxyethyl-N'-m-chloromethyl phenyl urea, N-hydroxyethyl-N'-chlorohexyl urea, glycerol monochloroethyl urethane, bromoacetyl dipropylenetriamine, chloroacetic acid diethanolamide. Short-chain isocyanate-reactive diamines and/or dihydroxy compounds are preferred chain-extending agents.

In the preferred chain-extending reaction with water, the isocyanate groups initially react with water and form amino groups which, in turn, react off with other isocyanate groups. Other preferred chain-extending agents are polyamines.

Suitable production processes for polyurethane dispersions are described, for example, in D. Dieterich, Angew Makromol. Chem. 98, page 133 (1981), Ullmann, Encyklop ädie der technischen Chemie, 4th Edition, Vol. 19, Verlag Chemie, Weinheim/Bergstrasse 1974, pages 311–313, Houben-Weyl, Methoden der organischen Chemie, Vol. E 20/Part 1–3, pages 1659–1663 and 1671–1681 and Journal of Waterborne Coating, August 1984, pages 2 et seq. The secondary literature references given in these publications also contain particulars of the relevant patent literature. Suitable polyurethane dispersions may be prepared by the so-called acetone process, as known from the above-cited EP 354 471. Additions of low-boiling solvents, for example acetone, are necessary inter alia to reduce the viscosity of the prepolymer and hence to improve its handling behavior which makes dispersion possible in the first place. Taking into account the need for solventless products, the disadvantage of such production processes is that the dispersion process has to be followed by a technically complex distillation step in order at least predominantly to remove the low boilers. This involves an additional process step which not only complicates the process, but also adds to the cost of the product, not least because the acetone preferably used cannot readily be recycled into the process because anhydrous acetone is preferably used. So far as the expert is concerned, this also prompts inter alia the question of whether and to what extent a residual solvent content is acceptable because this determines the cost of the process. However, this does conflict with the need for a solventless product.

The polyurethane prepolymers according to the present invention can be produced in solventless form. In other words, the reaction of reactants (I) to (IV) to form the reaction products and dispersion of the prepolymer phase may be carried out in the absence of inert solvents. To this end, the above-described reactants (I) to (III) are mixed at room temperature. In general, the reaction may be carried out in standard tank reactors. The reaction temperature is between about 90° C. and 120° C. The reaction mixture may contain the additions of catalysts required for polyurethane reactions. The reaction mixture is normally stirred until the required NCO content is reached. Dispersion in water is followed by reaction with aminoalcohols (IV) which react off at least partly with the NCO groups of the prepolymers. The reaction may also be carried out by the so-called one-reactor process and also by the so-called two-reactor process. In the first case, which is preferred for the purposes of the invention, the polyurethane prepolymers are dispersed with vigorous stirring while water is introduced with the quantity of base, for example sodium hydroxide, required for neutralization. On the other hand, however, the prepolymer phase may also be introduced into the aqueous base solution and dispersed therein with vigorous stirring. In both cases, dispersion may be carried out at elevated temperatures. The aminoalcohols (IV) may also be combined with the NCO-functional prepolymers in the form of a mixture with the water or the aqueous neutralizing agent. This may optionally be followed by stirring for 1 to 3 hours, optionally with chain extension by water in conjunction with residual NCO groups. The solids content of the dispersions may be varied over a wide range, for example from 25 to 50% by weight. The polyurethane dispersions used as reaction component (A) normally have a solids content of around 40% by weight.

To form a two-component reactive system, the above-described polymer dispersions may contain as reactive component (B) polyfunctional compounds which are capable of reacting off with the functional groups of the polyurethane prepolymers of reactive component (A). Resin component (A) according to the invention may be reacted with a relatively broad range of curing agents, for example isocyanates, epoxides, polyethyleneimines or triaziridines and melamine/formaldehyde systems. The acid groups optionally present in the prepolymer may also be bridged by polyvalent ions, more particularly polyvalent heavy metal ions, for example zinc or zirconium. To this extent, the polyvalent cations may be regarded as polyfunctional compounds. However, reactive component (B) preferably contains reactive polyfunctional organic compounds. Polyfunctional isocyanates or epoxides are preferred. Of the substances suitable as curing agents, those which can be stably incorporated in resin component (A), preferably in the form of a fine dispersion, are preferred. Ideally, these substances should also be able to form a stable aqueous dispersion.

The reactive terminal OH groups of the polyurethane prepolymers are accessible in particular to curing by addition of polyisocyanate compounds. The prepolymers used in the aqueous dispersion of reaction component (A) preferably contain around 0.2 to 1.0% by weight of isocyanate-reactive groups, expressed as OH functions. A content of 0.4 to 0.6% by weight is particularly suitable.

Reactive component (B), also known as the curing agent, preferably consists at least predominantly of water-dispersible polyisocyanates (V). Corresponding isocyanates are already known to the expert, for example from D. Dieterich, Chemie in unserer Zeit 24, (1990), 135 to 141. Particularly suitable isocyanates are water-dispersible aliphatic HDI triisocyanurates and HDI biurets. Triglycidyl isocyanurate is another preferred isocyanate. Other suitable isocyanates are compounds in which solid crystalline diisocyanate is encapsulated in a thin diffusion barrier layer which suppresses any further polyaddition at room temperature. A particularly suitable diisocyanate for this process is N,N'-bis-(2-isocyanatotolyl)urea (TDIH) which may be prepared from an emulsion of tolylene diisocyanate (TDI) in water. By particular management of the reaction, the terminal isocyanate groups inside the particles remain intact. Only when the diffusion barrier layer is thermally or mechanically destroyed are these isocyanate groups able to react off, for example with reactive component (A). In a preferred embodiment of the invention, (V) consists at least predominantly of HDI polyisocyanurates and/or HDI biuret isocyanates. The ratio of (A) to (B) may be varied over a broad range. However, (B) is normally present in more than the stoichiometrically necessary quantity. A particularly favorable film-forming addition ratio is obtained with a 1.2- to 2.5-fold stoichiometric excess of (B).

The process for producing a two-component reactive system of components (A) and (B) is characterized in that the reactive polyfunctional compounds suitable as curing agent are finely dispersed, preferably in stable form, in resin component (A). In one particular embodiment of the process, the polyfunctional reactive compounds suitable as curing agent are first dispersed in an aqueous medium and the resulting dispersion is subsequently mixed with resin component (A). Polyfunctional isocyanates, especially those which form stable dispersions in water, are preferably used in the processes described above.

Since reactive component (B) can also be dispersed in water, preferably without a solvent, totally solventless two-component reactive systems can be produced. In addition to the constituents already mentioned, the dispersions according to the invention may contain additives known to the expert for polymer dispersions as catalysts, wetting agents, defoaming agents, flow controllers, fillers, pigments, dyes, thickeners and the like.

The described polyurethane dispersions are the subject of DE 41 09 477 which also describes their use as a two-component reactive system for bonding and coating. However, there is no reference whatever to the use of the resin component or the two-component reactive system as a primer for plastics. They are particularly suitable for use as primers for PVC profiles in the continuous process. After drying and, optionally, storage, the plastic surfaces thus pretreated may be bonded to other plastics, more especially plastic films, by applying a polyurethane hotmelt adhesive to the film and pressing both onto the primed surface. The polyurethane dispersion may be diluted as required with water, for example to allow trouble-free processing through low viscosities. The primer may be applied to the plastic surfaces by spray coating, brush coating, roll coating, knife coating or by means of felts. The primer should be applied in a quantity of 3 to 50 $g/m^2$ (wet film). After application of the primer, the plastic surface is dried either by storage at room temperature or by using hot air blowers, drying cupboards or infrared heaters. The primed surface is preferably bonded immediately after drying. However, it may also be bonded several days later.

In principle, any PVC profiles are accessible to this treatment both in regard to their outline and in regard to their hardness. However, the treatment is preferably applied to semirigid and rigid PVC profiles of the type used for doors and windows.

A reactive polyurethane hotmelt adhesive is best used. The reactive polyurethane hotmelt adhesive is preferably a moisture-curing polyurethane hotmelt adhesive essentially obtained by the reaction of an NCO-containing component with a hydroxyl-containing component of a polyether, polyester and/or polyether ester and a low molecular weight polyol.

It is sufficient to treat only one of the parts to be joined, more especially the PVC profile, with the primer. It is also sufficient to apply the hotmelt adhesive to only one of the parts to be joined, i.e. either the profile or to the film. The adhesive may of course also be applied to both the parts to be joined and—of course—also "in-line".

To obtain as good an effect as possible, it is best to treat the profile with the primer and to apply the adhesive to the film so that, immediately after the treatment, bonding may be carried out in a single machine, for example in a laminating machine or sheathing machine, in which the film and the profile are pressed together. However, bonding may also be carried out sometime after priming of the profile. The intervening period may be a week or more. The processing temperature of the adhesive is preferably in the range from 100 to 130° C.

The film does not have to meet any particular requirements either in regard to its thickness or in regard to its constituent material. Besides PVC, the following polymers inter alia may be used: polyesters, polyolefins and polymethyl methacrylates.

The process according to the invention for the production of a PVC profile coated with a PVC film comprises a) priming the PVC profile, b) applying a reactive polyurethane hotmelt adhesive to the PVC profile, to the PVC film or to both and c) applying the PVC film by calendering.

Plastic profiles from which, 7 days after curing, the PVC film cannot be removed without destruction can be obtained by the process according to the invention. In addition, curing of the film immediately after bonding is so uniform and intensive that the film is difficult to peel off.

The invention is illustrated by the following Examples.

EXAMPLES

Examples 1 to 3

Primer A=primer according to the invention

Primer B=comparison primer based on a polyurethane dispersion

Primer C=comparison primer based on a vinyl acetate/vinyl ether/acrylate terpolymer and a vinyl acetate/ethylene/acrylic acid ester terpolymer.

Primer A was prepared as follows:

13.88 Parts by weight of a linear polyester (consisting of adipic acid, isophthalic acid and diethylene glycol) with an OH value of 57.5 mg KOH/g are reacted with 5.94 parts by weight of a linear polyester (adipic acid, neopentyl glycol, diethylene glycol, hexane-1,6-diol, OH value 61.5), 1.18 parts by weight of dimethylol propionic acid (DMPA) and 5.84 parts by weight of m-tetramethyl xylylene diisocyanate (m-TMXDI) at a maximum temperature of 110° C. When an NCO content of 1.5% is reached, the prepolymer is dispersed in 42.00 parts by weight of water containing 0.84 part by weight of triethylamine at a temperature of 70 to 80° C. and 0.30 part by weight of monoethanolamine is added immediately thereafter. Further chain extension takes place with stirring over a period of 2 hours at 80° C. The dispersion is cooled to room temperature.

Solids: 40% pH: about 7

Viscosity: 16 secs., 4 mmDIN cup, 20° C.

6 Parts by weight of a water-emulsifiable HDI biuret are homogeneously incorporated in 100 parts by weight of this polyurethane dispersion.

This primer was applied by felt to a 250×50 mm PVC window profile. The primer is applied in a quantity of 5 to 20 g/m² (wet). The primer coats are dried with hot air. A moisture-curing polyurethane hotmelt adhesive is then applied to a PVC film using a coating machine. The quantity applied amounted to 40 to 50 g/m²; the temperature of the adhesive was 110 to 120° C. The adhesive-coated film is immediately pressed onto the primed profile and thus bonded.

To evaluate the bond, the peel strength of a 20 mm wide strip is determined in accordance with DIN 53530 after curing times of 1, 3 and 7 days at a peeling angle of 90° and at a crosshead speed of 50 mm/min.

|         |        | Peel strength [N/mm] | | |
|---------|--------|-------|--------|-----------|
| Example | Primer | 1 Day | 3 Days | 7 Days    |
| 1       | A      | 2.1   | 2.4    | >5.0 (MF) |
| 2       | B      | 0.8   | 0.8    | 0.9       |
| 3       | C      | 0.6   | 0.9    | 1.0       |

MF = Material failure of the film; bond undamaged.

Examples 4 and 5

Primers A and B are applied as described in Examples 1 to 3. However, bonding of the film with the polyurethane hotmelt adhesive is not carried out immediately, but instead 4 days after application of the primers. In the meantime, the primers are dried at room temperature. The bonds were found to have the following peel strengths:

|         |        | Peel strength [N/mm] | | |
|---------|--------|-------|-------------|--------|
| Example | Primer | 1 Day | 3 Days      | 7 Days |
| 4       | A      | 1.05  | 2.6         | 3.1    |
| 5       | B      | 0.6   | No adhesion | —      |

In Examples 6 and 7, primer A was varied as follows:

In both cases, the OH-terminated polyurethane dispersion was no longer reacted with the polyisocyanate HDI biuret (primer A2). In addition, in the case of primer A1, 70 parts by weight of an aqueous dispersion of the OH-terminated polyurethane were mixed with 30 parts by weight of a 50% dispersion based on acrylate copolymers in the presence of 0.04% of a defoamer.

The primers were applied in a quantity of 10 to 20 g/cm² (wet). The primer coat is dried with hot air. The adhesive was applied and bonding was carried out in the same way as described in Examples 1 to 5. The following peel strengths were measured as a function of the cure time:

|         |        | Peel strength [N/mm] | | |
|---------|--------|-------|--------|------------------|
| Example | Primer | 1 Day | 3 Days | 7 Days           |
| 6       | A1     | 1.1   | 2.1    | 3.4              |
| 7       | A2     | 2.1   | 2.9    | 3.7 Partial material failure |

What is claimed is:

1. A process of bonding a first plastic surface to a second plastic surface comprising the steps of (a) applying to the first plastic surface an aqueous dispersion of a reactive polyfunctional organic compound and a hydroxyl-functional polyurethane prepolymer, said reactive polyfunctional organic compound being capable of reacting with said hydroxyl-functional polyurethane prepolymer and said aqueous dispersion being essentially free of solvent and obtained by:

(1) reacting:

(i) a polyol component containing a polyester polyol;

(ii) a compound containing at least one group capable of salt formation and at least two isocyanate-reactive groups; and (iii) an isocyanate component in a stoichiometric excess, at least 20% by weight of said isocyanate component consisting of tetramethyl xylylene diisocyanate;

to form an initial prepolymer; and (2) dispersing the initial prepolymer of step (1) in water and at least partially reacting the remaining NCO groups in said initial prepolymer with an aminoalcohol to form the hydroxyl-functional polyurethane prepolymer; and (3) combining the hydroxyl-functional polyurethane prepolymer obtained in step (2) with the reactive polyfunctional organic compound to form the aqueous dispersion;

(b) drying said aqueous dispersion to form a primer on said first plastic surface;

(c) applying a reactive polyurethane hotmelt adhesive either to the primer on said first plastic surface, to the second plastic surface, or to both the primer on said first plastic surface and to said second plastic surface; and (d) pressing together said first and second plastic surfaces.

2. The process claimed in claim 1 wherein said polyester polyol present in said polyol component is prepared using a member selected from the group consisting of adipic acid and phthalic acid.

3. The process claimed in claim 1 wherein said polyester polyol has a number average molecular weight in the range from 300 to 5,000.

4. The process claimed in claim 1 wherein the group capable of salt formation is a carboxylic acid, a sulfonic acid, or an ammonium group.

5. The process claimed in claim 1 wherein said isocyanate component contains at least 30% by weight of said tetramethyl xylylene diisocyanate.

6. The process claimed in claim 1 wherein no solvent is used in said process.

7. The process claimed in claim 1 wherein in step (1), the NCO:OH addition ratio is not greater than 2.0:1, but is greater than 1:1.

8. The process claimed in claim 1 wherein said aminoalcohol is a monoaminoalcohol.

9. The process claimed in claim 1 wherein said compound containing a group capable of salt formation in the polyurethane prepolymer is present in an amount of from 1 to 13% by weight based on the solids content of the aqueous dispersion.

10. The process claimed in claim 1 wherein in the reaction of the NCO groups with said aminoalcohol, the NCO:amine addition ratio is in the range from 1:1 to 1:0.1.

11. The process claimed in claim 1 further comprising chain-extending the initial prepolymer subsequent to step (a)(2), wherein said chain-extending is carried out with a member selected from the group consisting of water and polyamines.

12. The process claimed in claim 1 wherein said reactive polyfunctional organic compound is an isocyanate.

13. The process claimed in claim 12 wherein said isocyanate is selected from the group consisting of hexamethylene diisocyanate polyisocyanurates and hexamethylene diisocyanate biuret isocyanates.

14. The process claimed in claim 12 wherein said isocyanate is present in a stoichiometric excess of 1.2 to 2.5-fold over said hydroxyl-functional polyurethane prepolymer.

15. The process claimed in claim 1 wherein the aqueous dispersion is additionally comprised of up to 80% by weight, based on the solids content of the aqueous dispersion, of one or more polymers prepared using acrylic compounds.

16. The process of claim 1 wherein the second plastic surface is comprised of a polymer selected from the group consisting of polyvinyl chlorides, polyesters, polyolefins and polymethylmethacrylates.

17. The process of claim 1 wherein the second plastic surface is a film.

18. The process of claim 1 wherein the first plastic surface is a surface of a polyvinyl chloride profile.

19. The process of claim 1 wherein the second plastic surface is also primed with said aqueous dispersion.

20. The process of claim 1 wherein the compound containing at least one group capable of salt formation is a dihydoxy or diamino compound.

21. A process of bonding a first plastic surface comprised of polyvinyl chloride to a second plastic surface comprised of polyvinyl chloride, said process comprising the steps of (a) applying to the first plastic surface an aqueous dispersion of a polyfunctional isocyanate and a hydroxyl-functional polyurethane prepolymer, said aqueous dispersion being essentially free of solvent and obtained by:

(1) reacting:

(i) a polyol component containing a polyester polyol having a number average molecular weight of from 300 to 5,000 and prepared using a member selected from the group consisting of adipic acid and phthalic acid;

(ii) a dihydroxy or diamino compound containing one or more ionizable groups selected from carboxylic acid groups, sulfonic acid groups, or ammonium groups, and (iii) an isocyanate component in a stoichiometric excess, at least 50% by weight of said isocyanate component consisting of tetramethyl xylylene diisocyanate to form an initial prepolymer;

(2) dispersing the initial prepolymer of step (1) in water and at least partially reacting the remaining NCO groups in said initial prepolymer with an aminoalcohol and, optionally, subsequently chain-extending with a member selected from the group consisting of water and polyamines to form the hydroxyl-functional polyurethane prepolymer; and (3) combining the hydroxyl-functional polyurethane prepolymer obtained in step (2) with the polyfunctional isocyanate to form the aqueous dispersion;

(b) drying said aqueous dispersion to form a primer on said first plastic surface;

(c) applying a moisture-curing polyurethane hotmelt adhesive either to said primer on said first plastic surface, to said second plastic surface, or to both the primer on said first plastic surface and to said second plastic surface; and (d) pressing together said first and second plastic surfaces.

22. The process claimed in claim 21 wherein in step (1) the NCO:OH addition ratio is not greater than 1.7:1, but is greater than 1:1.

23. The process claimed in claim 21 wherein said polyester polyol has a number average molecular weight in the range from 500 to 3,000.

24. The process claimed in claim 21 wherein said aminoalcohol is monoethanol amine.

25. The process claimed in claim 21 wherein the dihydroxy or diamino compound is dimethylol propionic acid and is present in an amount of from 2 to 8% by weight based on the solids content of the aqueous dispersion.

26. The process claimed in claim 21 wherein the polyfunctional isocyanate is selected from the group consisting of hexamethylene diisocyanate polyisocyanurates and hexamethylene diisocyanate biuret isocyanates.

27. The process claimed in claim 21 wherein the polyfunctional isocyanate is utilized in a stoichiometric excess of 1.2 to 2.5-fold relative to the hydroxyl-functional polyurethane prepolymer.

28. The process claimed in claim 21 wherein said aqueous dispersion is applied in a quantity of 3 to 50 g/m² to the first plastic surface.

29. The process as claimed in claim 21 wherein the moisture-curing polyurethane hotmelt adhesive is at a temperature of from 100° C. to 130° C. when applied in step (c).

30. The process as claimed in claim 21 wherein the first plastic surface is a film.

31. The process claimed in claim 21 wherein the second plastic surface is a surface of a polyvinyl chloride profile.

32. The process as claimed in claim 21 wherein the dihydroxy or diamino compound is selected from the group consisting of carboxylic acid diols having 4 to 10 carbon atoms, diamino sulfonic acids, and amino diols.

33. The process as claimed in claim 21 wherein the primer is additionally comprised of a polymer prepared using an acrylic compound.

34. The process as claimed in claim 21 wherein a polyol other than the polyester polyol is present in said polyol component.

35. The process as claimed in claim 21 wherein the polyester polyol is prepared using a glycol containing ether oxygen.

36. The process as claimed in claim 21 wherein the first plastic surface is a polyvinyl chloride film and the second plastic surface is a surface of a polyvinyl chloride profile.

37. The process as claimed in claim 21 wherein said pressing together is accomplished by calendaring.

* * * * *